Figure 1:
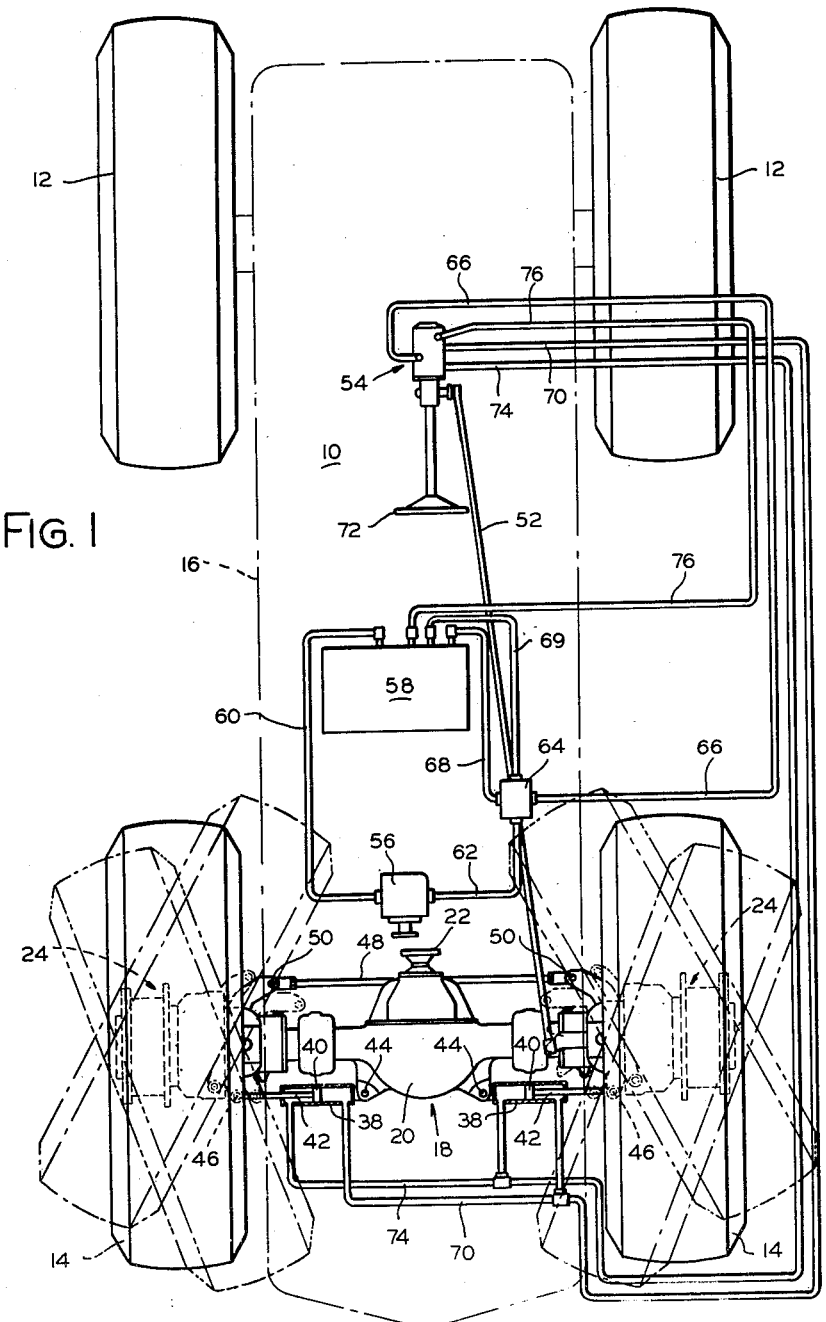

July 19, 1960

C. J. JACOBUS 2,945,544

HYDRAULIC POWER STEERING FOR LAND VEHICLE

Filed April 24, 1957

3 Sheets-Sheet 1

INVENTOR.
CHARLES J. JACOBUS
BY
*J. Frederick Bechtel*
ATTY.

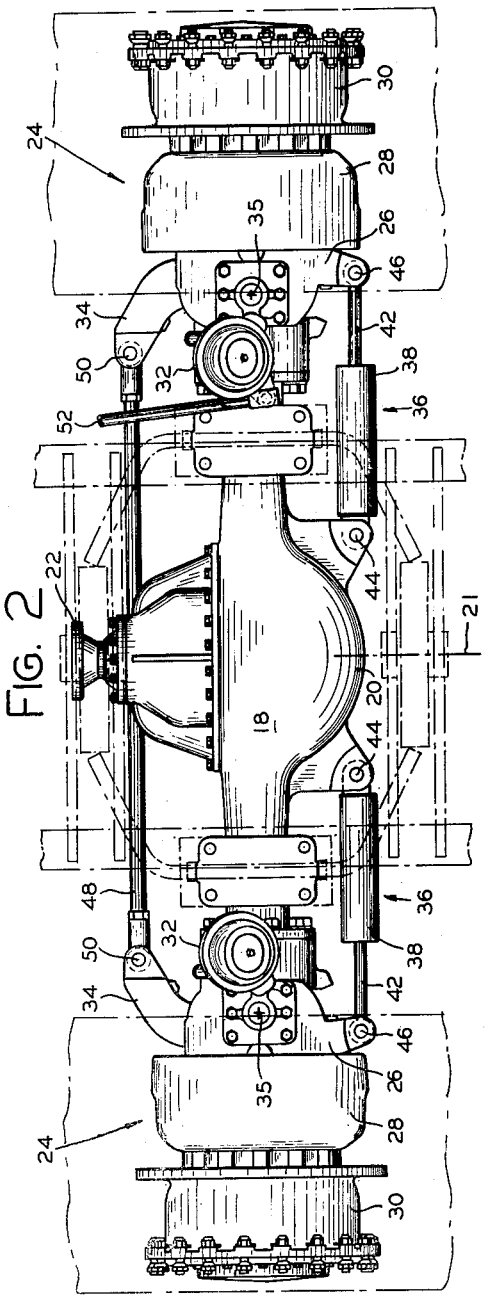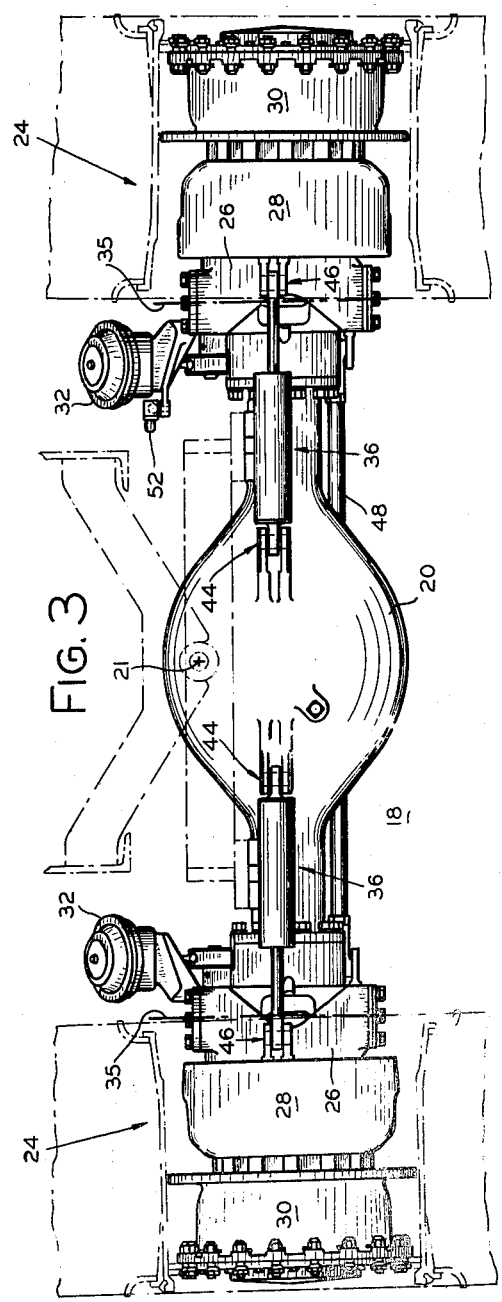

United States Patent Office 2,945,544
Patented July 19, 1960

2,945,544

HYDRAULIC POWER STEERING FOR LAND VEHICLE

Charles J. Jacobus, Benton Harbor, Mich., assignor to Clark Equipment Company, a corporation of Michigan Filed Apr. 24, 1957, Ser. No. 654,702

3 Claims. (Cl. 180—79.2)

This invention relates to power steering mechanisms for vehicles, and more particularly to mechanisms of the type frequently referred to as "full" power steering. In this type mechanism, the operator's steering wheel on the vehicle operates a pilot device which controls power actuators that provide the sole means for steering the vehicle, as contrasted to so-called power boost steering mechanisms in which the operator's steering wheel has a direct mechanical connection with the dirigible wheels of the vehicle and power operated means are provided to assist in the turning of the dirigible wheels.

The present invention is particularly advantageous for large highway and off-the-road vehicles; however, it is adaptable also for use with smaller vehicles.

Most power steering mechanisms which have been used heretofore employ a single hydraulic or other power actuator for turning the dirigible wheels of the vehicle. Such power actuator is connected with two or more wheels of the vehicle by a mechanical linkage of suitable configuration. Such linkages commonly are of heavy and bulky construction, particularly on the larger vehicles, in order to transmit the forces involved in turning two or more wheels by means of a remotely located power device. Such linkages frequently include several ball or other self-aligning joints which are bulky and expensive.

A disadvantage of conventional power steering mechanisms which are actuated by a single power device is that in almost every case, due to the unbalance in the friction and other resistance of the elements of the mechanical linkage, considerably greater effort is required to steer in one direction than the other. Thus if a single actuator is used for operating the dirigible wheels in both directions, obviously the amount of force used in steering in one direction must be considerably greater than is actually required in order to have sufficient force available for steering in the other direction.

The object of the present invention is to provide a power steering mechanism which provides the proper balance of steering force in both directions.

A further object of the invention is to provide a power steering mechanism which is simple and relatively inexpensive to manufacture and which uses smaller and less expensive parts than conventional mechanisms of this type.

In carrying out my invention in one form I provide a vehicle steering mechanism which has a pair of oppositely disposed piston and cylinder actuators connected between an intermediate portion of the axle and pivoted portions at the end of the axle upon which the wheels are mounted. The cylinders are connected to the intermediate portion of the axle and the piston rods are connected to the pivoted portions. A control valve operated by the operator's steering wheel is provided for admitting fluid under pressure simultaneously to the rod end of one cylinder and the opposite end of the other cylinder for steering the vehicle in one direction, and for admitting fluid under pressure simultaneously to the rod end of the second cylinder and the opposite end of the first cylinder for steering the vehicle in the opposite direction.

Power steering mechanisms embodying two actuators have been disclosed previously but none of them of which I am aware suggests the structure or provides the advantages of the fluid pressure and mechanically balanced mechanism disclosed and claimed herein.

Figure 4:
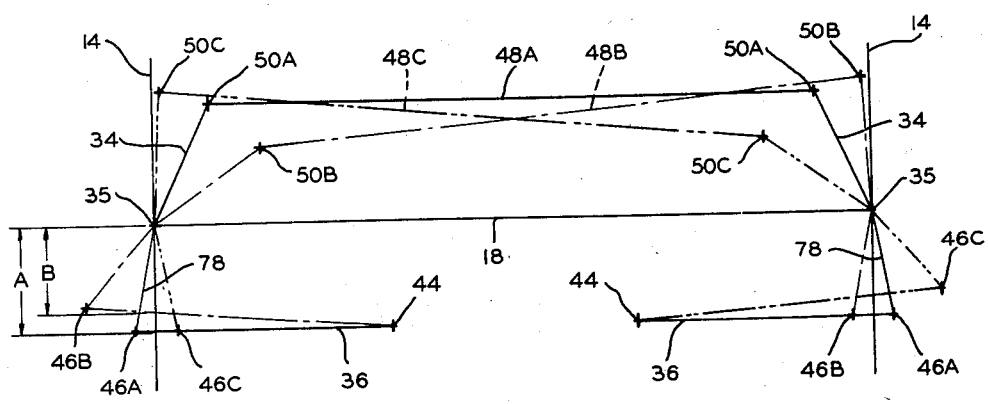

For a clearer and more complete understanding of my invention, reference should be had to the accompanying drawing in which:

Figure 1 is a partially schematic view illustrating a preferred form of my steering mechanism, Figure 2 is a top view of the steering drive axle shown in Figure 1, Figure 3 is a rear view of the same steering drive axle, and Figure 4 is a diagram illustrating the operation of my invention.

Referring to the drawing, I have indicated by the numeral 10 a four wheel rubber tired vehicle having a pair of front wheels 12 and a pair of rear dirigible wheels 14. The body portion of the vehicle which is indicated in phantom is designated by the numeral 16. The typical vehicle utilized herein for purposes of illustration is adapted to be equipped with a bucket, fork or other material handling device, mounted at the front of the vehicle on pivoted boom arms, although it will be readily appreciated, of course, that my invention is not limited to use with such vehicles.

In the typical vehicle illustrated all four wheels are drive wheels, being connected for operation by a prime mover (not shown) through a suitable power train including a transmission, interconnecting shafts and drive axles, one of which is indicated by the numeral 18 in the four figures of the drawing. Axle 18 as illustrated is a combined steering and driving axle of the full floating type having an axle housing 20 of the so-called banjo type which houses differential, axle shaft and other components. A propeller shaft (not shown) is connected to the coupling member 22 for driving the differential and axle shafts and wheels 14. As shown axle 18 is pivotally connected to frame 19 of the vehicle, being arranged to pivot about a longitudinal, horizontally disposed axis 21.

Axle 18 has portions 24, which are referred to herein as pivoted portions, pivotally mounted at the ends thereof. These pivoted portions in this typical case include additional stub shafts connected to the aforementioned axle shafts through universal joints for rotation thereby, planetary gear mechanisms for rotating the wheels at slower speed than the axle shafts, brake drums, wheel hubs and other parts. The tires and other parts which make up wheels 14 are rotatably mounted on these pivoted portions 24. If more details are desired on these pivoted portions, reference may be had to copending application Serial No. 630,499 of Melvin E. Dreitzler, filed December 26, 1956, now Patent No. 2,871,966, dated February 3, 1959, which discloses in detail a structure of this type. Axle 18 as illustrated herein includes the structure claimed in the said Dreitzler application, although it will be readily understood that such a structure is not essential to the present invention and forms no part of this invention. As illustrated, pivoted portions 24 of the axle include respectively housing portions 26, brake drums 28, wheel hubs 30, brake actuators 32, and projections 34 which are rigidly connected to the housings 26. The pivoted portions 24 of the axle are pivotally connected to the intermediate portion of the axle to pivot about the vertically disposed axes 35.

A pair of piston and cylinder actuators 36 are utilized for pivoting the pivoted portions of the axle and the wheels mounted thereon. Each of these actuators, as shown in Figure 1, comprises a cylinder 38 and a piston 40 therein mounted on a piston rod 42. The two actuators are arranged in oppositely disposed or push-pull relation, with the cylinders 38 connected at locations 44 to the axle housing 20 and the piston rods 42 connected at points 46 to the respective pivoted portions 24. A tie rod 48 connects the projections 34 on the pivoted portions of the axle, this tie rod being connected between points 50 and 50 on the respective projections. The operation of this tie rod is explained in detail hereinafter. An additional rod 52 is connected between the right pivoted portion 24 and the pilot or control device 54, described hereinafter, which controls the power actuators.

The control device 54 is one element of a fluid control system which includes a pump 56 which is driven by the prime mover of the vehicle in the customary manner. This pump draws fluid from a reservoir or sump 58 through a suction line or conduit 60 and discharges fluid under pressure into a line 62. The numeral 64 indicates a regulator and relief device which maintains a predetermined flow in fluid line 66 while allowing excess fluid to return to the reservoir 58 through line 68; and device 64 also limits the pressure in line 66 to a predetermined value, the overflow returning to the reservoir 58 through line 69. Line 66 supplies fluid under pressure to the control device 54 which is a valve mechanism of known type and admits fluid under pressure to line 70 when the operator's steering wheel 72 is turned in one direction from a neutral position, and admits the fluid under pressure to a line 74 when the operator's steering wheel is turned in the other direction. Line 76 provides for the return of fluid to the reservoir 58.

Line 70 is connected to the piston rod end of right cylinder 38 and to the opposite end of left cylinder 38. Thus, when operator's steering wheel 72 is turned counterclockwise (looking forwardly at the steering wheel in Figure 1) the left actuator 36 is extended and the right actuator 36 is contracted, and continued operation of the steering wheel 72 in this direction moves both the wheels 14 to the positions indicated by the dash single dot lines in Figure 1. Operation of the steering wheel 72 in the clockwise direction admits fluid under pressure to line 74. This line conducts fluid to the rod end of the left cylinder and the opposite end of the right cylinder and moves the wheels in the opposite direction. The extreme position to which the wheels move in this direction is indicated by the dash double dot lines in Figure 1. It will be understood that when line 70 is conneted to the source of fluid pressure that the line 74 is connected to bleed, i.e., to return fluid to the reservoir through line 76, while when line 74 is connected to the source of pressure line 70 is connected to bleed. It will be understood also by those familiar with fluid circuits of this type that rod 52 provides a follow-up connection between the right pivoted portion 24 of the axle and pilot device 54 which acts to stop pivoting action of the dirigible wheels when turning of the operator's steering wheel 72 ceases. That is, rod 52 tends to restore equilibrium in the control device 54.

Figure 4 is a diagram showing some of the essential parts of this steering mechanism in the same position as illustrated in Figure 1. In Figure 4 the transverse axis of the axle is represented by the numeral 18 which represents a complete axle in other figures. The two lines indicated by the numerals 14 represent the two wheels in their straight ahead position. The pivot points 35, 44 and 46 and 50 in this figure correspond to Figure 2. Letters A, B and C have been added to the symbols for certain of the pivot points and parts, the letter A indicating the straight ahead position, the letter B indicating a full left turn position, and the letter C indicating a full right turn position. The numeral 78 is used in Figure 4 to indicate the lever arm between pivot points 35 and 46. It should be noted in the drawing that pivot points 46 are farther apart than pivot points 35.

The left character 46A in Figure 4 indicates the pivot connection between left actuator 36 and the left pivoted portion 24 of the axle with the wheels 14 in the straight ahead position. If left actuator 36 is extended to move the wheel 14 to the full left turn position, (not illustrated in Figure 4 for sake of simplicity, but shown in Figure 1) left pivot point 46 moves to the position indicated by the left character 46B. During this movement the effective moment arm through which left actuator 36 applies turning force on the left pivoted portion 24 of the axle changes from the distance indicated by the letter A to that indicated by the letter B (the moment arm is the perpendicular drawn from pivot point 35 to the axis of operation of actuator 36). During such operation pressure is being applied in the left actuator 36 at the end opposite the rod end, and it will be appreciated that the force produced by this left actuator is greater than that produced by the right actuator 36 in which the pressure is applied at the rod end, the ratio of the forces being equal to the ratio of the full area of the piston compared to the area of the piston minus the area of the piston rod. This is true since the fluid pressure is the same in both cylinders, and in the left actuator such fluid acts on the full area of the piston while in the right actuator it acts on the area of the piston minus the area of the rod. Thus, the actuator which exerts the greater force, namely, the left one, is acting through a reducing moment arm, while the other actuator which exerts a smaller force is acting through a moment arm which remains practically unchanged. While the latter action occurs on the right side of the vehicle (for a left turn) the relative positions of 46A and 46C for the connection between left actuator 36 and lever arm 78 illustrate the action. As this left actuator is retracted pivot 46 moves from 46A to 46C and during such movement the moment arm remains practically constant at value A. Inasmuch as the operation on the right side of the vehicle is the mirror image of that on the left side it will be appreciated that as the pivot point 46 at the left side of the machine moves from 46A to 46B and the moment arm changes from A to B, the pivot point 46 at the other side of the machine moves from right position 46A to right position 46B and the moment arm on this right side remains approximately at value A.

It will be appreciated also that while operation for a left turn has been described, in which the larger force and the smaller moment arm are on the left side and the smaller force and the larger moment arm are on the right side, that for a right turn the reverse is true with the smaller force and larger moment arm on the left and the larger force and smaller moment arm on the right. This arrangement, which combines the larger force with the smaller moment arm on one side of the machine with the smaller force and the larger moment arm on the other side provides a portion of the mechanical-fluid balance in the present steering mechanism.

Another portion of such balance is provided by tie rod 48 in combination with the fluid connections to the actuators. It will be noted that each of the projections 34 to which the tie rod is connected is located inwardly at an angle with respect to the wheels when the latter are in their straight ahead position. Thus, tie rod 48 is shorter than the distance between the two pivot points 35, and the resulting four sided geometric figure 18, 34, 48, 34 is not a parallelogram. The effect of this is that when left pivot point 50 goes from the straight ahead position illustrated at 50A to the extreme left turn position indicated by 50B the left wheel 14 turns through a greater angle than the right wheel 14 where the right pivot point 50 also is moving from 50A to 50B. See Figure 1 for an illustration of this. Since the effective lever arm of the left lever 34 becomes less as the wheel turns in this direction while the right lever arm remains approximately the same, more movement is required of the left lever arm than the right, and this results in a greater turning of the left wheel than the right. It will be appreciated that such unequal turning of the dirigible wheels is desirable to prevent tire scuffing inasmuch as the inside wheel must follow an arc of smaller radius than the outside wheel. It will be understood that a turn in the opposite direction causes the actions of the two wheels and related parts to be reversed.

Since the same source of pressure is connected to both actuators 36 and tie rod 48 connects together the two pivoted portions 24 of the axle, another fluid-mechanical balance is produced. The two actuators cause the turning of the wheels but the tie rod connects them together and assures that each turns the proper amount. The tie rod transmits some force between the two wheels at times in order to maintain the desired relation between them but in my steering mechanism the tie rod does not need to be nearly as strong and heavy as in single actuator steering mechanisms in which the tie rod transmits all of the force to one of the wheels. My arrangement also cushions shocks caused by one of the wheels striking a chuckhole, obstruction or the like, because if the shock is sufficiently great fluid is transferred from one actuator to the other. This permits the wheel to get out of the proper relation temporarily, but the correct relation will be restored promptly by the tie rod. Another advantage of my mechanism is that in an emergency when one of the actuators is inoperative, steering can be accomplished with a single actuator, with the tie rod then acting in the conventional manner to steer the wheel which has the inoperative actuator.

This mechanism also permits the use of a smaller rod 52 than some conventional steering mechanisms in which all the forces for steering both wheels are transmitted through this rod. In the present mechanism this rod is for follow-up or control purposes only and therefore may be relatively light and inexpensive. With this mechanism both rods 48 and 52 and all of the fittings associated therewith may be much lighter and less expensive than many conventional steering mechanisms, thus solving a serious problem which has resulted from the fact that in many machines, particularly large ones, these parts have become so heavy and bulky that it has been very difficult to find sufficient space to accommodate them. Of course, such large parts are more expensive, particularly the self-aligning joints.

It is to be noted that the mounting of the two actuators on the axle housing in the manner of the present mechanism eliminates the universal joints which are required in some steering mechanisms in which the actuator is connected to the frame. In this construction relatively simple pivot connections may be utilized at points 44 and 46.

While I have described and illustrated my invention in a preferred form embodied with a steering drive axle it will be understood that it is applicable also for a steering axle which is not a drive axle, as well as for a steering axle which is at the front of the vehicle instead of at the rear as shown in Figure 1. Modifications may be made in my invention such as, for example, putting the two actuators in front of the axle adjacent the tie rod instead of to the rear of the axle as illustrated. The fluid employed in this mechanism preferably is conventional hydraulic fluid; however, the invention is not limited to such fluid. Thus, while I have shown herein a preferred embodiment of my invention it will be understood that modifications may be made, and I intend to cover by the appended claims all such modifications which fall within the true spirit and scope of my invention.

I claim:

1. In a vehicle, an intermediate axle portion, a pair of pivoted portions located at the outer ends of the said intermediate axle portion and pivotally connected thereto, a pair of oppositely disposed piston and cylinder actuators each having a piston rod extending from one end only connected respectively between the said intermediate portion and the said pivoted portions, the cylinders of the said actuators being connected to the said intermediate axle portion and the piston rods of the actuators being connected respectively to the said pivoted portions, the distance between the two connections of the piston rods with the respective pivoted portions being greater than the distance between the connections of the said two pivoted portions with the said intermediate axle portion, and means for supplying fluid under pressure to the said cylinders for pivoting the said pivoted portions in the selected direction, said means including fluid connections for supplying fluid from a control device through a common conduit simultaneously to the rod end of a first one of the said cylinders and the opposite end of the second said cylinder and other fluid connections for supplying fluid from a control device through a second common conduit simultaneously to the rod end of the second cylinder and the opposite end of the first cylinder.

2. In a vehicle, an intermediate axle portion, a pair of pivoted portions located at the outer ends of the said intermediate axle portion and pivotally connected thereto, a pair of oppositely disposed piston and cylinder actuators each having a piston rod extending from one end only connected respectively between the said intermediate axle portion and the said pivoted portions, the cylinders of the said actuators being connected to the said intermediate axle portion and the piston rods to the said pivoted portions, the distance between the two connections of the piston rods with the respective pivoted portions being greater than the distance between the connections of the said two pivoted portions with the said intermediate axle portion, means for supplying fluid under pressure to the said cylinders for pivoting the said pivoted portions in the selected direction, said means including means for supplying pressurized fluid through a common valve means and a common conduit means simultaneously to the rod end of a first one of the said cylinders and the opposite end of the second said cylinder and other means for supplying pressurized fluid through another common valve means and another common conduit means simultaneously to the rod end of the second cylinder and the opposite end of the first cylinder, and a tie rod connected between the said pivoted portions, the distance between the connections of the tie rod with the said pivoted portions being less than the said distance between the connections of the said pivoted portions with the said intermediate axle portion.

3. In a vehicle, an intermediate axle portion, a pair of pivoted portions located at the outer ends of the said intermediate axle portion and pivotally connected thereto, a pair of wheels rotatably mounted respectively on the said pivoted portions, a pair of oppositely disposed piston and cylinder actuators connected respectively between the said intermediate axle portion and the said pivoted portions, each of the said actuators having a cylinder member and a piston slidable therein and a piston rod connected to the piston and extending out only one end of the said cylinder member, the cylinder members of the said actuators being connected to the said intermediate axle portion and the piston rods of the said actuators being connected to the said pivoted portions, the distance between the two connections of the piston rods with the respective pivoted portions being greater than the distance between the connections of the said two pivoted portions wtih the said intermediate axle portion, a tie rod connected between the said pivoted portions, the distance between the connections of the tie rod with the said pivoted portions being less than the said distance between the connections of the said pivoted portions with the said intermediate axle portion, first fluid conduit means for supplying fluid simultaneously to the rod end of a first one of the said cylinder members and the opposite end of the said second cylinder member, second fluid conduit means for supplying fluid simultaneously to the rod end of the said second cylinder member and the opposite end of the said first cylinder member, a source of fluid under pressure, control valve means operated by an operator's steering wheel for admitting fluid selectively to one of the said fluid conduit means for turning the said wheels in a selected direction, and rod means connected between one of the said pivoted portions and the said control valve means for restoring the control valve means to equilibrium responsively to movement of the said one pivoted portion.

References Cited in the file of this patent

UNITED STATES PATENTS

| 2,274,821 | Bloxsom | Mar. 3, 1942 |
| 2,334,918 | French | Nov. 23, 1943 |
| 2,555,649 | Krotz | June 5, 1951 |
| 2,557,936 | Brown | June 26, 1951 |
| 2,567,074 | Kupiec | Sept. 4, 1951 |

FOREIGN PATENTS

| 839,712 | France | Apr. 11, 1939 |
| 662,749 | Germany | July 20, 1938 |
| 705,758 | Germany | May 8, 1941 |